US006832215B2

(12) United States Patent
Gauthier et al.

(10) Patent No.: US 6,832,215 B2
(45) Date of Patent: Dec. 14, 2004

(54) METHOD FOR REDIRECTING THE SOURCE OF A DATA OBJECT DISPLAYED IN AN HTML DOCUMENT

(75) Inventors: Matthew Charles Gauthier, Redmond, WA (US); Robert Hawking, Seattle, WA (US); Tyson Murray, Maple Valley, WA (US); Wentao Chen, Sammamish, WA (US); Hien Anh Bui, Sammamish, WA (US); Anna Timasheva, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 315 days.

(21) Appl. No.: 09/818,286

(22) Filed: Mar. 27, 2001

(65) Prior Publication Data

US 2002/0143520 A1 Oct. 3, 2002

Related U.S. Application Data (60) Provisional application No. 60/220,236, filed on Jul. 21, 2000.

(51) Int. Cl.$^7$ ................................................. G06F 7/00
(52) U.S. Cl. .............................. 707/1; 707/10; 707/100; 709/201
(58) Field of Search ............................. 707/1, 10, 100, 707/104.1; 709/201, 219, 224, 227; 715/513, 515

(56) References Cited

U.S. PATENT DOCUMENTS

| | | | | |
|---|---|---|---|---|
| 5,812,769 A | * | 9/1998 | Graber et al. ............... | 709/228 |
| 5,870,546 A | * | 2/1999 | Kirsch ......................... | 709/205 |
| 5,948,061 A | * | 9/1999 | Merriman et al. .......... | 709/219 |
| 5,963,915 A | * | 10/1999 | Kirsch ......................... | 705/26 |
| 6,029,175 A | * | 2/2000 | Chow et al. ............. | 707/104.1 |
| 6,049,821 A | * | 4/2000 | Theriault et al. ........... | 709/203 |
| 6,061,700 A | * | 5/2000 | Brobst et al. ............... | 715/517 |
| 6,073,241 A | * | 6/2000 | Rosenberg et al. ......... | 713/201 |
| 6,108,703 A | | 8/2000 | Leighton et al. ............ | 709/226 |
| 6,189,030 B1 | * | 2/2001 | Kirsch et al. ............... | 709/224 |
| 6,347,398 B1 | * | 2/2002 | Parthasarathy et al. ..... | 717/178 |
| 6,424,980 B1 | * | 7/2002 | Iizuka et al. ................ | 715/513 |
| 6,456,308 B1 | * | 9/2002 | Agranat et al. ............. | 345/854 |
| 6,466,966 B1 | * | 10/2002 | Kirsch et al. ............... | 709/203 |
| 6,476,833 B1 | * | 11/2002 | Moshfeghi ................... | 345/854 |
| 6,516,338 B1 | * | 2/2003 | Landsman et al. .......... | 709/203 |
| 6,591,295 B1 | * | 7/2003 | Diamond et al. ........... | 709/217 |
| 6,687,737 B2 | * | 2/2004 | Landsman et al. .......... | 709/203 |

FOREIGN PATENT DOCUMENTS

| | | |
|---|---|---|
| EP | 0 921 480 A2 | 6/1999 |
| EP | 1 026 605 A1 | 8/2000 |

\* cited by examiner

*Primary Examiner*—Greta Robinson
*Assistant Examiner*—Miranda Le
(74) *Attorney, Agent, or Firm*—Merchant & Gould (57) ABSTRACT

The invention is a method for Web authors to include a redirection tag in an HTML data object tag that redirects an application program to an alternative source file that stores underlying data associated with an HTML data object that a user has selected to import into the application program. Typically, HTML data objects in Web page are stored in HTML format. However, when a user selects an HTML object to import, they generally expect to import the data in the format that it was originally created in, such as XML. The redirection tag "redirects" the application program to an alternative source file where the underlying data is stored in a rich format, such as XML. The application program then imports the underlying data of the HTML data object from the alternative source file.

19 Claims, 4 Drawing Sheets

METHOD FOR REDIRECTING THE SOURCE OF A DATA OBJECT DISPLAYED IN AN HTML DOCUMENT

CROSS REFERENCE TO RELATED APPLICATIONS

This application claims priority to provisional patent application Ser. No. 60/220,236, filed Jul. 21, 2000 entitled, "Method for Redirecting the Source of a Data Object Displayed in an HTML Document."

TECHNICAL FIELD

The invention generally relates to redirecting an application program to the source of an HTML object that is stored in an alternative source file, and more specifically relates to embedding a redirection tag within an HTML data object that points to the underlying source of the HTML data object stored in an alternative source file.

BACKGROUND

The file format known as "Hypertext Markup Language" (HTML), which is used for developing Web pages, is optimized for displaying data objects and not describing the underlying data format associated with the data object. Therefore, even though the data object is visible to the user in the Web page, application programs that wish to make use of the data object displayed on the Web page may have trouble interpreting the data. This is due to the fact that application programs are unable to interpret the context of how data is used in a Web page because HTML does not define the "data type" of the data objects. For example, a character string may be displayed in an HTML document as "3-9-00." The character string may represent a number, a date, an identification number, or a part of a larger number within the document. Because the character string is stored in HTML format in the Web page, the application program in which the character string is to be imported may not be able to interpret the character string correctly. For instance, if the character string is imported into a spreadsheet program, the spreadsheet program may interpret the character string "3-9-00" as a date, when the character string may actually be an identification number. Therefore, the meaning of the data would be misinterpreted by the spreadsheet program, which may lead to a result that is different from what the user expects.

Another problem encountered with importing data from an HTML document into an application program is that the information displayed in the HTML document may only be a subset of the actual data. Typically, the Internet's bandwidth and response time limit the amount of data that may be transferred at any given time. Therefore, large amounts of data may be broken down into smaller subsets, or "pages" of data to be downloaded separately. For example, suppose a user wishes to search the Internet for all sites that include information about snow skiing. When the search is complete, the number of "hits," or sites relating to snow skiing that the search uncovered may be too large to present to the user at one time on a single Web page. Therefore, the results of the search may be stored at a remote server. The search results would then be parsed into multiple "pages," with each page containing a predefined number of sites. The "pages" may then be displayed one at a time to the user. However, if the user wanted to import the entire search results into an application program, such as a spreadsheet or database, the user would typically have to load each page individually and save the contents separately. Depending on the size of the search results, this process would be tedious and time consuming, which can lead to errors and frustration on the part of the user.

Thus, there is a general need in the art for an improvement to the HTML file structure to allow data objects in an HTML document to be imported into application programs, such that the original context, or data type, of the data object is preserved. There is a still a further need in the art for a method of redirecting application programs to an alternative location to retrieve the underlying data associated with the data objects displayed in the HTML document.

SUMMARY OF THE INVENTION

Generally described, the invention meets the above-described needs by providing a custom attribute that is added to the standard HTML file format. The custom attribute redirects an application program to an alternative location where the underlying data associated with a data object displayed on the Web page is stored. The custom attribute comprises a redirection attribute. The redirection attribute is placed within a specific HTML data object tag. The redirection attribute indicates that the data object tag has associated underlying data stored at an alternative location. The redirection attribute contains a connection string, or URL, that points to the alternative location where the underlying data is stored.

More specifically, the invention also describes a method of redirecting an application program to an alternative location to retrieve at least one data object stored at the alternative location in an alternative source file. First, a user command is received, selecting at least one data object that is displayed in the HTML document to be imported into the application program. Next, the data object tag associated with the data object that the user specified to import is retrieved. The data object tag is then examined to determine whether the redirection attribute exists. If the redirection attribute exists, it is retrieved. The connection string that points to the alternative location where the data object is stored is retrieved from the redirection attribute and the alternative location is accessed. Next, the underlying data associated with the data object and stored in an alternative file format is retrieved from the alternative site and imported into the application program. However, if the data object tag does not contain the redirection attribute, then the data object displayed in the HTML document is imported directly into the application program.

The invention may also determine whether more than one instance of tabular data is selected. If more than one instance of tabular data is selected, then the redirection attribute is ignored and the data is imported directly from the HTML document in the HTML file format. However, if only one instance of tabular data is selected then the HTML tag is retrieved and the determination is made whether the redirection attribute is present. It should be noted that limiting the redirection tag to import only a single instance of tabular data is due to the limitation of the MICROSOFT EXCEL spreadsheet program. Currently, the MICROSOFT EXCEL spreadsheet program does not have the ability to import multiple instances of data from an alternate source into a single worksheet. The invention has the ability to import data from the source instead of the HTML document, no matter how many objects are selected.

Yet another aspect of the invention is to determine whether the redirection attribute has been disabled. If the redirection attribute has not been disabled, then the connection string is retrieved and the alternative location is opened.

However, if the data object tag does not contain the connection string or the redirection attribute is disabled, then the data object displayed in the HTML document is imported directly into the application program in HTML format.

That the invention improves over the drawbacks of the current HTML file structure to allow data objects in an HTML document to be imported into application programs, such that the original file format, or data type of the data object is preserved and provides a method for redirecting an application to an alternative source file that contains the underlying data displayed in the HTML document and accomplishes the advantages described above will become apparent from the following detailed description of the exemplary embodiments and the appended drawings and claims.

DETAILED DESCRIPTION OF EMBODIMENTS OF THE INVENTION

The invention is a method for Web authors to include a custom attribute in an HTML document that redirects an application program to an alternative location that stores the underlying data in an alternative source file associated with a data object displayed on the Web page. In one embodiment, the invention is incorporated into a suite of computer application programs such as the MICROSOFT OFFICE XP application suite, marketed by Microsoft Corporation of Redmond, Wash. Briefly described, this invention includes an improvement to the standard HTML file format that allows Web authors to add a redirection attribute to data objects on their Web pages.

Generally described, the redirection attribute is used when the Web author creates a Web page containing a data object in HTML format with a redirection to an alternative source for the underlying data associated with the data object. The Web author's motivation for redirecting to an alternative site is that the end user (i.e., the person viewing the Web page) will want to analyze the data in an application program differently than a Web browser program. The redirection attribute "routes" the application program to an alternative location where the underlying data is stored and returns that same information displayed by the HTML data object, but in a file format that is optimized for data semantics.

One common implementation of the redirection attribute is for a Web Query in a spreadsheet program. Typically, data objects are stored in HTML format in a Web browser application program. However, when a user creates a Web Query they generally want to import the data in the format that is optimized for use in the spreadsheet program (i.e., the MICROSOFT EXCEL spreadsheet program). Therefore, the redirection tag "redirects" the spreadsheet program to the alternative site where the underlying data is stored in a robust format, such as Extensible Markup Language (XML). The spreadsheet program can then import the underlying data rather than the data object in HTML form to create the Web Query. The end-user is unaware that any redirection has taken place.

However, before a redirection tag can be used, the HTML document must be modified. Generally, an HTML file includes a hierarchical set of markup elements. Most markup elements include a start tag, followed by content, followed by an end tag. The content is typically a combination of text and nested markup elements. Tags, which are enclosed in angle brackets ('<' and '>'), indicate the file structure and the format of the object data. There are tags for markup elements such as titles and headers, for tabular data, for text attributes such as bold and italic, for lists, for paragraph boundaries, for links to other documents or other parts of the same document, for graphic images, for non-displayed comments, and for many other features.

Typically, Web authors modify the HTML at the time the HTML document is created. Specifically, Web authors must add a namespace to the HTML tag and a redirection attribute to each object data tag in the HTML document whose underling data is stored at an alternative location. As an example, to create a Web Query that redirects the application program to the underlying source of the tabular data, Web authors need to add the following MICROSOFT OFFICE namespace declaration to the HTML tag of the HTML document:

<HTML xmlns:o="urn:schemas-microsoft-com:office:office"> which associates the namespace name "urn:schemas-microsoft-com:office:office" with the prefix "o."

Next, later on in the <TABLE> tag in the BODY hierarchy of the HTML document, Web authors must include a redirection attribute to the data object tag whose underlying data is stored at an alternative location. The redirection attribute contains a connection string, which is a pointer to the location where the underlying data is stored. Typically, the connection string is a Uniform Resource Locator ("URL"). However, the connection string may be any data string that provides an address to the location of the underlying data and information on how to retrieve the underlying data. Using the Web Query as an example, Web authors must include within the <TABLE> tag the following redirection attribute:

<TABLE . . . o:WebQuerySourceHRef="http:// . . . >

The "o" prefix indicates that "WebQuerySourceHRef" attribute's namespace is "urn:schemas-microsoft-com:office:office," which was previously defined in the <HTML> tag. Furthermore, the "WebQuerySourceHRef" attribute specifically identifies that the underlying source of the tabular data is stored at an alternative location. Specifically, the connection string "http:// . . . " identifies the address of the alternative location where the underlying data is stored.

Adding redirection attributes to an HTML document enables an application program, such as the MICROSOFT EXCEL spreadsheet program, to correctly interpret the semantics of the data object the user has selected from an HTML document. Rather than retrieving a data object stored in HTML format, the MICROSOFT EXCEL spreadsheet program retrieves the underlying data stored in its original, rich format from the URL specified by the connection string.

Exemplary Operating Environment

Figure 1:
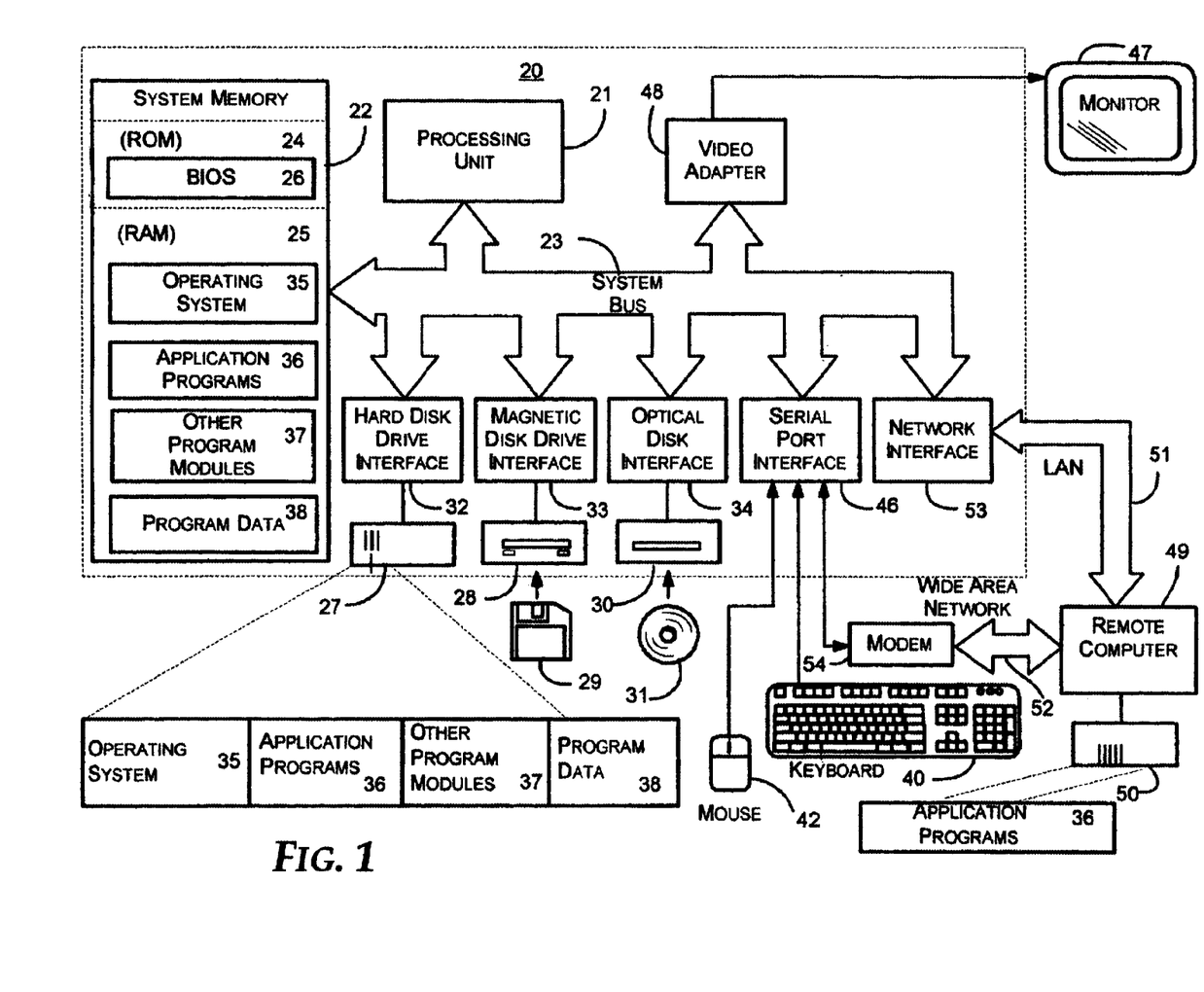
FIG. 1 is block diagram of a personal computer that provides the operating environment for an embodiment of the invention.

FIG. 1 and the following discussion are intended to provide a brief, general description of a suitable data-computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device, or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary Embodiments of the Invention

Figure 2:
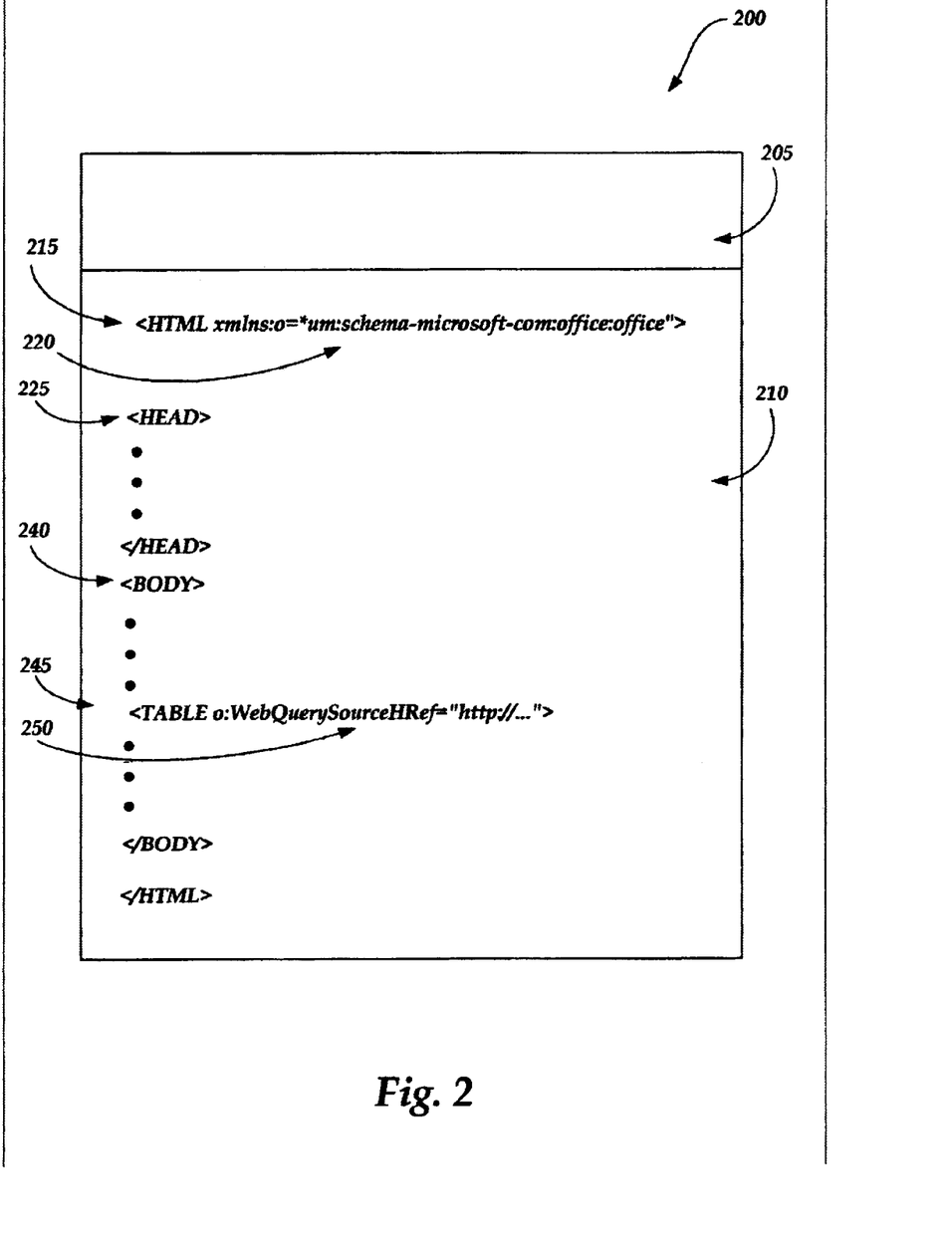
FIG. 2 is a block diagram of a file structure of an HTML document implementing the redirection tag.

FIG. 2 is an illustration of an HTML file 200 showing the HTML file structure. The HTML file 200 contains a header portion 205 and a content portion 210. The header portion 205 typically contains information regarding the management of the file, such as the name of the file, the size of the file, the time and date that the file was created, and the address of where the file is located.

The content portion 210 contains the HTML tag 215, which indicates the beginning of the HTML document, which in turn includes a HEAD tag 225 and a BODY tag 240. The BODY tag 240 contains a plurality of object data, which are enclosed in angle brackets ('<' and '>'), known as tags. The tags indicate the structure and the format of the object data that are displayed in the HTML document.

The HTML tag 215 contains a namespace 220 whenever at least one of the data objects in the content portion 210 is stored at an alternative site. Typically the alternative site will be an electronic file stored at a remote server. However, the alternative site may also be a separate file stored on a local hard drive, a remote hard drive or any other file separate from the HTML document stored in a memory device.

One implementation of the redirection attribute will be used in the generation of a Web Query by a user who imports data from a Web page and analyzes the imported data in a spreadsheet program, such as the MICROSOFT EXCEL spreadsheet program. When the end-user imports tabular data from an HTML document displayed in a Web browser program into the MICROSOFT EXCEL spreadsheet program, the MICROSOFT EXCEL spreadsheet program is redirected to an alternative site where the underlying data associated with the data object is stored in a rich XML source. It should be noted that other data objects, such as text, video files, and audio files may be imported into other application programs, such as presentation programs, word-processing programs, and the like using the redirection tag 215 without departing from the scope of the invention.

The redirection attribute is created by the Web author and may be placed anywhere within the HTML document 200. For the example of creating a Web Query, Web authors must create a MICROSOFT OFFICE program namespace declaration 220 in the <HTML> tag 215. Specifically, in order to supply the redirection tag for Web Queries, Web authors insert an additional declaration in the HTML tag 215 of the HTML document 200 of the form:

<HTML xmlns:o="urn:schemas-microsoft-com:office:office">

The HTML tag 215 initializes an operator "o" that defines a uniform resource name ("URN") that in turn defines the namespace declaration, which in this example is "schemas-microsoft-com:office:office."

The <BODY> tag 240 also contains several object tags, one of which is a <TABLE> tag 245. The <TABLE> tag 245 contains a redirection attribute 250 that is associated with a <TABLE> tag 245. The redirection attribute 250 contains a connection string, which provides an address to the location of the underlying data. In the above example of supplying the redirection tag to a Web Query, the HTML document author must insert the following redirection attribute to the TABLE tag:

<TABLE . . . o:WebQuerySourceHRef="http:// . . . > which indicates the uniform resource locator (URL) of the underlying data. In this illustration, the redirection attribute 250 is given within the context of a <TABLE> tag 250. This is due to the fact that creating a Web Query requires tabular data. It should be noted that the redirection attribute 245 may be given in the context of a PRE, XMP, PLAINTEXT or LISTING tag because each one of these tags are capable of containing tabular data.

The redirection attribute 250 contains the URL of the Web site containing the underlying data. Therefore, whenever a user selects the data object associated with the <TABLE> tag 245 to create a Web Query, the URL indicates to the MICROSOFT EXCEL spreadsheet program where the data exists. The operation of redirecting the MICROSOFT EXCEL spreadsheet program to the alternative file location is transparent to the user, who believes that the data is being retrieved from the HTML document and not from the alternative file location.

Figure 3:
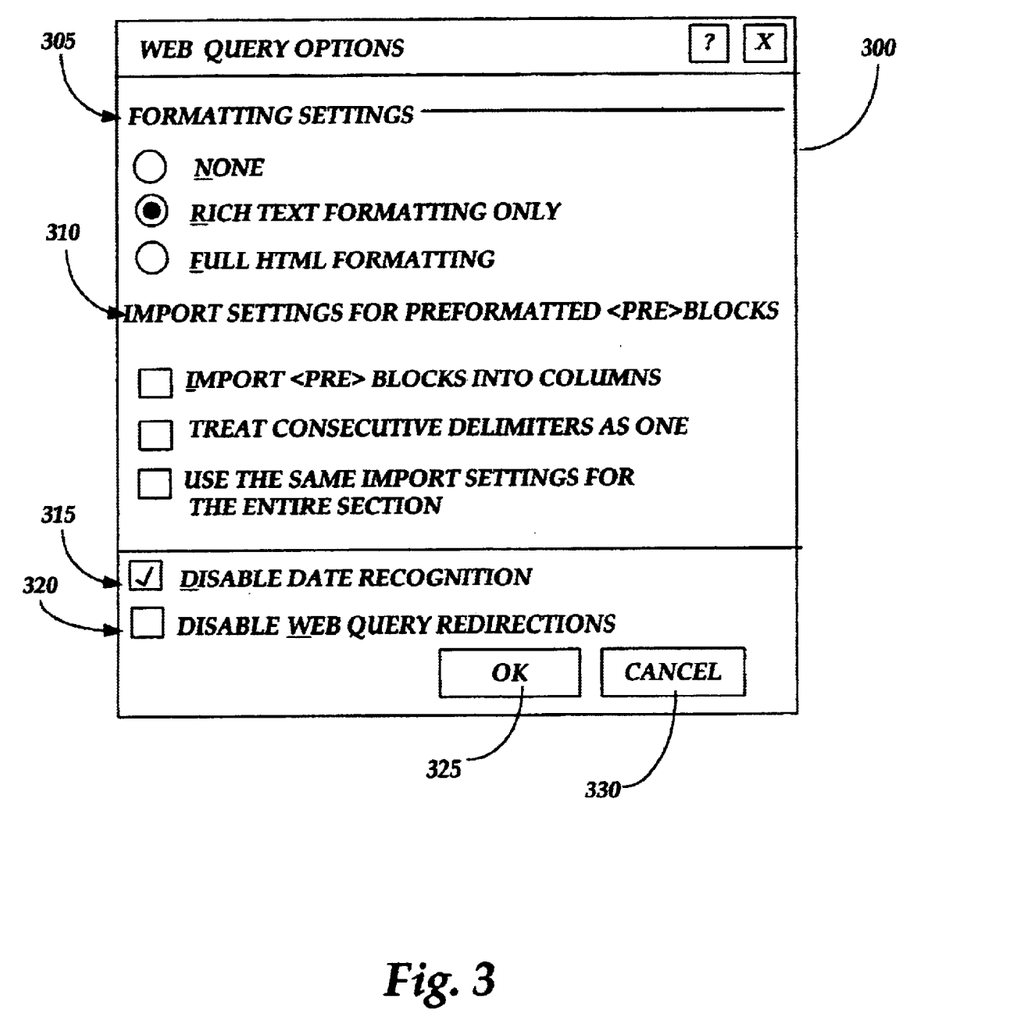
FIG. 3 is a screen shot illustrating a dialog box that enable a user to disable the redirection tag.

FIG. 3 is a screen shot of a dialog box that is used to disable the redirection attribute. The illustration specifically shows a Web Query Options dialog box 300 in the MICROSOFT EXCEL spreadsheet program that allows the user to disable the redirection attribute when creating a Web Query. The Web Query Options dialog box 300 contains formatting settings 305, import settings for preformatted <PRE> blocks 310 and an area 315 that allows users to disable features of the Web Query including a "Disable Web query redirection" check box 320. The "Disable Web query redirection" checkbox 320 is unchecked by default. However, when the "Disable Web query redirection" check box 320 is selected, a redirection flag is set to a specified value. The redirection flag is a Web Query table property and therefore, is saved with the MICROSOFT EXCEL spreadsheet file. The specified value that the redirection flag may be set to is selected from two Boolean values "TRUE" or "FALSE." When the redirection flag is set to the Boolean value "TRUE," the redirection attribute is ignored and the tabular data displayed in the HTML document, rather than the underlying data stored at the alternative location, is imported into the Web Query. Conversely, when the redirection flag is set to the Boolean value "FALSE," the redirection attribute is used to "direct" the MICROSOFT EXCEL spreadsheet program to the alternative file location to retrieve the underlying data associated with the selected tabular data.

Figure 4:
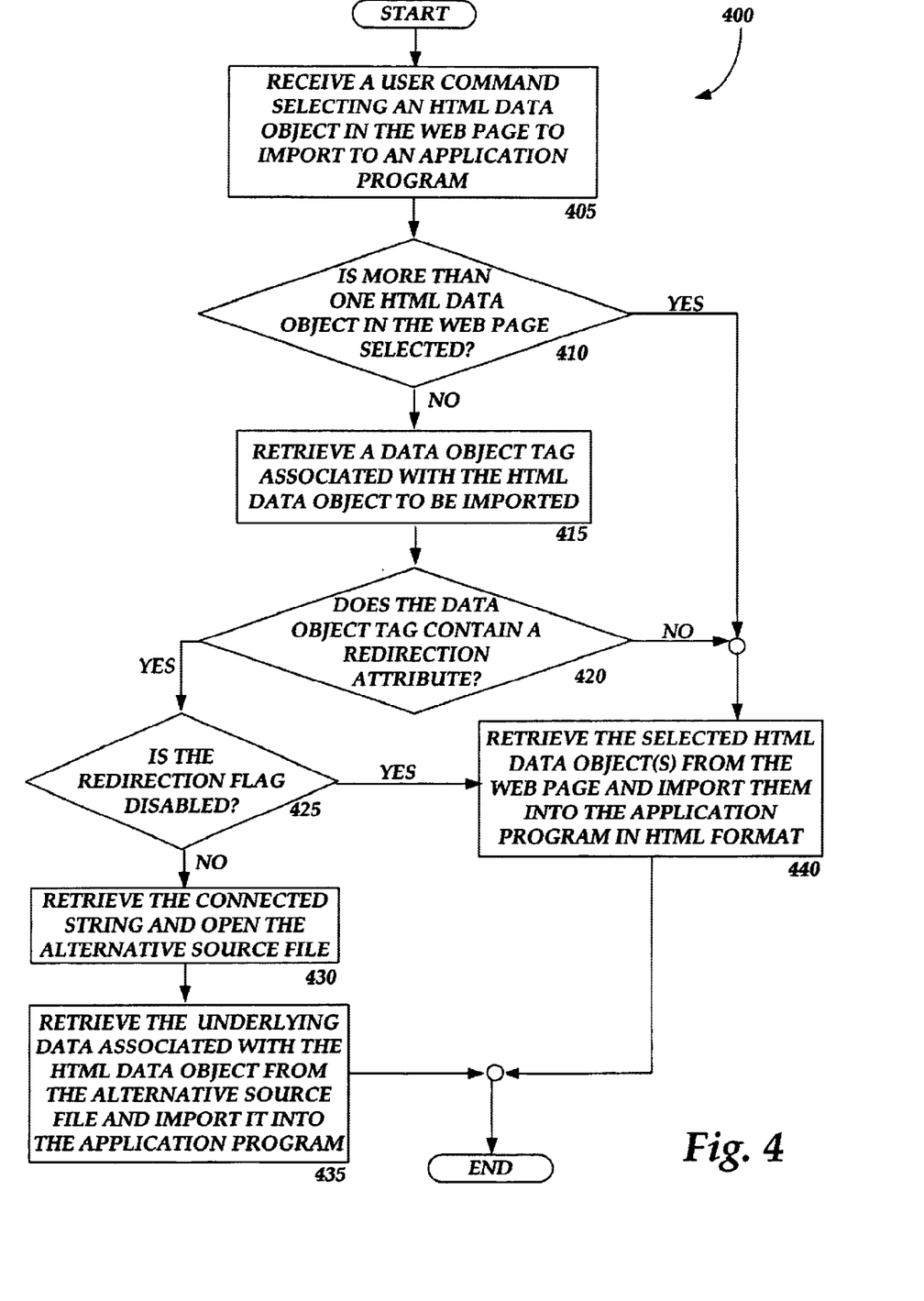
FIG. 4 is a logic flow diagram illustrating an exemplary method to implement the redirection tag.

FIG. 4 is a logic flow diagram of routine 400 for a method for redirecting an application to the alternative location that contains the underlying data of a data object displayed in the HTML document. The discussion of routine 400 is specifically directed toward redirecting the source of a Web Query in the MICROSOFT EXCEL spreadsheet program. However, those skilled in the art will appreciate that the redirection attribute can be applied to other application programs, such as word processing or desktop publishing without departing from the scope of the invention.

Routine 400 begins at step 405, in which a user command is received selecting at least one data object to import into the MICROSOFT EXCEL spreadsheet program. Step 405 is followed by step 410, in which the determination is made whether more than one instance of an HTML data object, such as tabular data, is selected in the Web page to import into the application program. If more than one instance of tabular data is selected, the "YES" branch is followed to step 440, in which the application program retrieves the data object directly from the HTML document and imports the data object in HTML format. The application program can still operate on the HTML data object. However, because the HTML data object is formatted as HTML, the application may misinterpret the data in attempting to operate on it depending on the nature of the data and the nature of the application program. For example, if the data object in the HTML document contains the character string "45," the application program may misinterpret the data. The number "45" may be an integer value representing the number of shares purchased by an individual or it may really be the price per share of a stock the user is interested in researching. Because HTML does not allow this type of extra information to be stored within the HTML data object, it is interpreted as a character string. However, if the data object is imported into the MICROSOFT EXCEL spreadsheet program, the character string will be treated differently if it is interpreted as an integer value than if it is interpreted as a monetary value, which may lead to a result that is different from what the user expects. Step 440 is then followed by the "END" step.

However, if the determination is made at step 410 that the only a single HTML data object was selected to be imported into the application program, the "NO" branch is followed to step 415. At step 415, the application program retrieves an HTML data object tag associated with the HTML data object to be imported. In the case of a Web Query, the data object tag will typically be a <TABLE> tag. However other tags such as <XMP>, <LISTING>, <PLAINTEXT>, <PRE>, and any other tags that are capable of storing tabular data may be retrieved. Once the HTML data object tag is retrieved, routine 400 proceeds to step 420, in which the determination is made whether the HTML data object tag contains a redirection attribute. If the HTML data object tag contains a redirection attribute, the "YES" branch is followed to step 425. At step 425, a second determination is made whether the Web Query redirection tag has been disabled. If the Web Query redirection tag has not bee disabled, then the "NO" branch is followed to step 430, in which the MICROSOFT EXCEL spreadsheet program retrieves a connection string associated with the redirection attribute. The connection string contains the address of the file that contains the HTML data object. Typically the connection string is a uniform resource locator (URL) of the alternative source file where the underlying data is stored. However, those skilled in the art will appreciate that the connection string may be a directory listing on a network or a local hard drive that points to where the underlying data is stored. The MICROSOFT EXCEL spreadsheet program then opens the alternative site associated with the connection string so that the underlying data may be accessed.

Step 430 is followed by step 435, in which the application program retrieves the underlying data associated with the HTML data object displayed in the Web page and imports the underlying data source into the application program. Typically, the underlying data source will be stored in a different format than the HTML data object displayed in the Web page. For instance, suppose the user wants to create a Web Query by importing tabular data displayed in the Web page. Typically, the tabular data in the Web page is stored in HTML format, which is optimized for displaying HTML data objects. However, the underlying data associated with the tabular data may be stored in a different, rich format, such as XML that is optimized for data semantics. Therefore, it is much more advantageous for the application program to operate on the underlying data source rather than the tabular data displayed in the Web page because the rich format of the underlying data source will allow the application program to provide the user with a more meaningful result. As a specific example, suppose a user wishes to import an HTML data object from a Web page into the MICROSOFT EXCEL spreadsheet program that contains the character string "9-6-00." The MICROSOFT EXCEL spreadsheet program would be unable to determine whether the character string represented a date, a number, or a combination because the character string is formatted as HTML. However, if the MICROSOFT EXCEL spreadsheet program retrieved the underlying data source associated with the character string, the data semantics of the character string could be determined due to the underlying data source being stored in a rich text format, such as XML. The rich text format of the underlying data source allows the MICROSOFT EXCEL spreadsheet program to properly interpret the character string and provide the user with the results that they expect. Step 435 is then followed by the "END" step.

Returning to step 425, if the determination is made that the redirection flag is disabled, then the "YES" branch is followed to step 440, in which the application program retrieves the HTML data object directly from the Web page and imports the HTML data object in HTML format. The application program can still operate on the HTML data object. However, because the HTML data object is formatted in HTML and not in a rich text format, the application program may misinterpret the data when attempting to operate on the imported HTML data object. Depending on the nature of the HTML data object and the nature of the application program, after operating on the imported HTML data object the application program may return results that are different than what the user expected.

The present invention thus provides a method for Web authors to include redirection tags associated with HTML data objects display on a Web page. The redirection tag is used when a user attempts to import an HTML object into an application program by redirecting the application program to an alternative source file where the underlying data associated with the imported HTML data object is stored in an alternative file format.

It should be understood that the foregoing pertains only to the exemplary embodiments of the present invention, and that numerous changes may be made to the embodiments described herein without departing from the spirit and scope of the invention.

We claim:

1. An HTML file format implemented within a computer system for redirecting an application program, executing to import at least one HTML data object, to an alternative source file to import an underlying data source associated with the at least one HTML data object into the application program, the HTML file format comprising:
   an HTML tag;
   a plurality of HTML data object tags wherein each HTML data object tag is associated with an HTML data object displayed in a Web page as provided by a source website;
   a redirection attribute associated with at least one of the plurality of HTML data object tags within an HTML file of the Web page wherein the Web page as provided by the source website includes the redirection attribute and wherein the redirection attribute is accessible via the source website and points to the alternative source file where the underlying data source associated with the at least one HTML data object is stored; and
   a redirection flag associated with the at least one HTML data object wherein when the redirection flag is not disabled, the application program is redirected by the redirection attribute to retrieve the underlying data source from the alternative source file upon selection via the Web page of the at least one HTML data object for import and wherein when the redirection flag is disabled, the HTML data object is imported from the Web page to the application program.

2. The HTML file format of claim 1, wherein the redirection attribute comprises a connection string that points to a location where the underlying data source is stored.

3. The HTML file format of claim 2, wherein the connection string comprises a uniform resource locator (URL).

4. A method for redirecting an application program to an alternative source file to retrieve an underlying data source associated with a plurality of HTML data objects displayed in a Web page as provided by a source website, wherein the HTML data objects are stored in HTML format, comprising:
   receiving a user command selecting at least one of the plurality of data objects to import from a Web page into an application program;
   retrieving an HTML data object tag associated with the selected HTML data object;
   determining if the HTML data object tag comprises a redirection attribute, the redirection attribute comprising a connection string that identifies an alternative source file where the underlying data source associated with the selected data object is stored;
   if the HTML data object tag comprises a redirection attribute determining whether a redirection flag associated with the selected data object is disabled;
   if the redirection flag is not disabled performing the sequence comprising:
      retrieving the connection string from the redirection attribute;
      opening the alternative source file identified by the connection string;
      retrieving the underlying data source; and
      importing the underlying data source into the application program; and
   if one of the HTML data object tag does not comprise the redirection attribute and the redirection flag is disabled, then importing the HTML data object from the Web page into the application program.

5. The method of claim 4, wherein the HTML data object is selected from a list consisting essentially of TABLE, PRE, XMP, LISTING, and PLAINTEXT.

6. The method of claim 4, wherein the connection string comprises a uniform resource locator (URL).

7. The HTML file format of claim 1, wherein the underlying data source comprises underlying data that defines a data type of the at least one HTML data object and wherein the alternative source file comprises an electronic file stored separately from the Web page.

8. The HTML file format of claim 1, wherein the redirection attribute is placed within the at least one HTML data object tag thereby indicating that the at least one HTML data object tag has associated underlying data stored at an alternate location.

9. The HTML file format of claim 1, wherein the HTML tag includes a namespace declaration.

10. The HTML file format of claim 2, wherein the connection string comprises a data string that includes at least one of an address of the location where the underlying data source is stored and information on how to retrieve the underlying data source.

11. The HTML file format of claim 1, wherein the alternative source file comprises one of the following:

an electronic file stored on a remote server; and an electronic file stored on a local hard drive of the computer system.

12. The HTML file format of claim 1, wherein the underlying data source comprises underlying data stored in a rich text format.

13. The HTML file format of claim 12, wherein the rich text format comprises XML.

14. The method of claim 4, wherein the underlying data source comprises underlying data that defines a data type of the HTML data object.

15. The method of claim 14, wherein the underlying data is stored in a rich text format.

16. The method of claim 4, wherein the Web page as provided by the source website includes the redirection attribute.

17. A computer-readable medium comprising computer executable instructions for performing the method of claim 4.

18. A method for redirecting an application program executing on a computer system to an alternative location in order to retrieve underlying data stored in the alternative location and associated with an HTML data object displayed in an HTML document wherein the HTML document as provided by a source website includes a redirection attribute, the method comprising:

receiving a command selecting the HTML data object for import into the application program from the HTML document as provided by the source website wherein the HTML data object is stored in an HTML format that excludes the underlying data associated with the HTML data object;

in response to receiving the command, retrieving an HTML data object tag associated with the selected HTML data object;

determining whether the HTML data object tag contains the redirection attribute, the redirection attribute comprising a data string that identifies the alternative location where the underlying data associated with the selected data object is stored; and in response to the HTML data object tag containing the redirection attribute determining whether a redirection flag associated with the selected HTML data object is disabled;

if the redirection flag is not disabled, executing a sequence comprising:

redirecting the application program to the alternative location identified in the redirection attribute; and retrieving the underlying data from the alternative location and importing the underlying data into the application program wherein the underlying data defines an original data type of the HTML data object whereby the application program is enabled to correctly interpret data semantics of the HTML data object.

19. The method of claim 18, wherein the sequence is transparent to an end-user of the application program whereby the underlying data appears to be retrieved from the HTML document and not the alternative location.

* * * * *